E. NORDSTROM.
INDEX MECHANISM.
APPLICATION FILED MAR. 24, 1919.
1,383,331. Patented July 5, 1921.
2 SHEETS—SHEET 2.
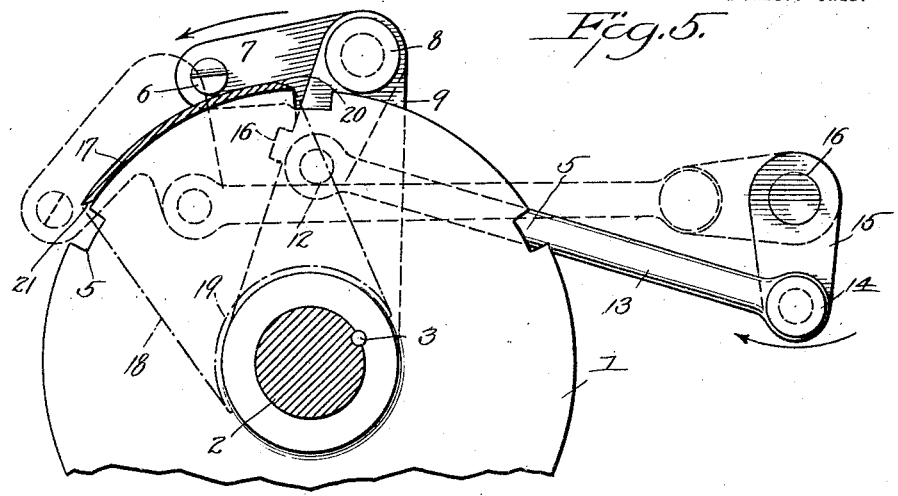
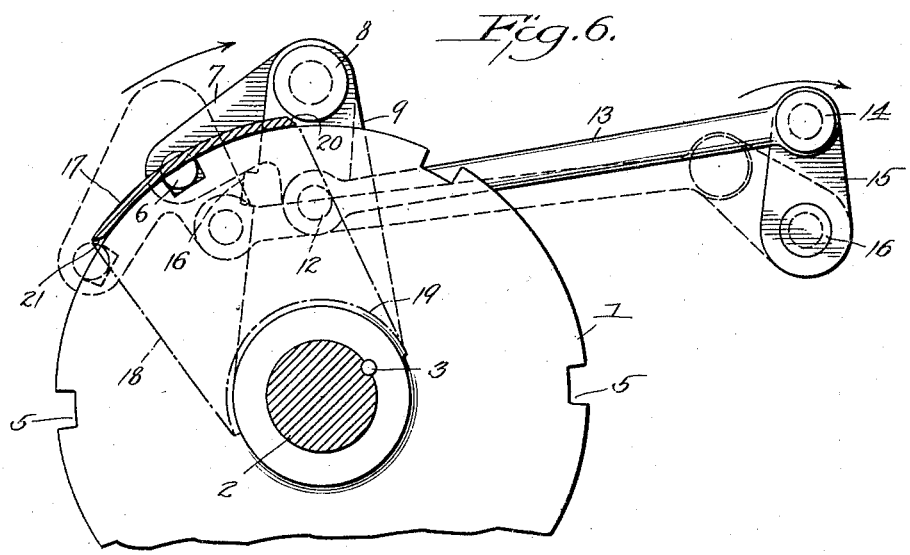
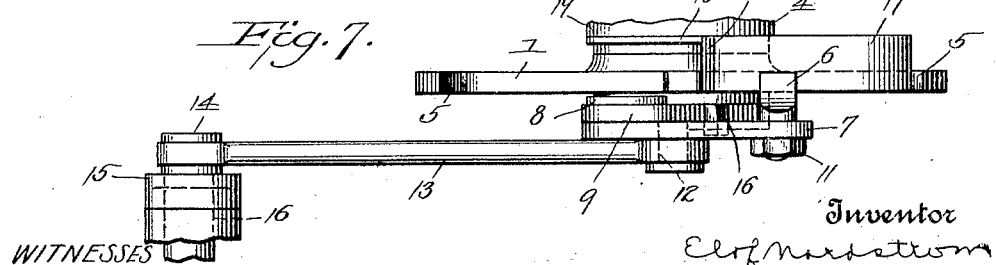

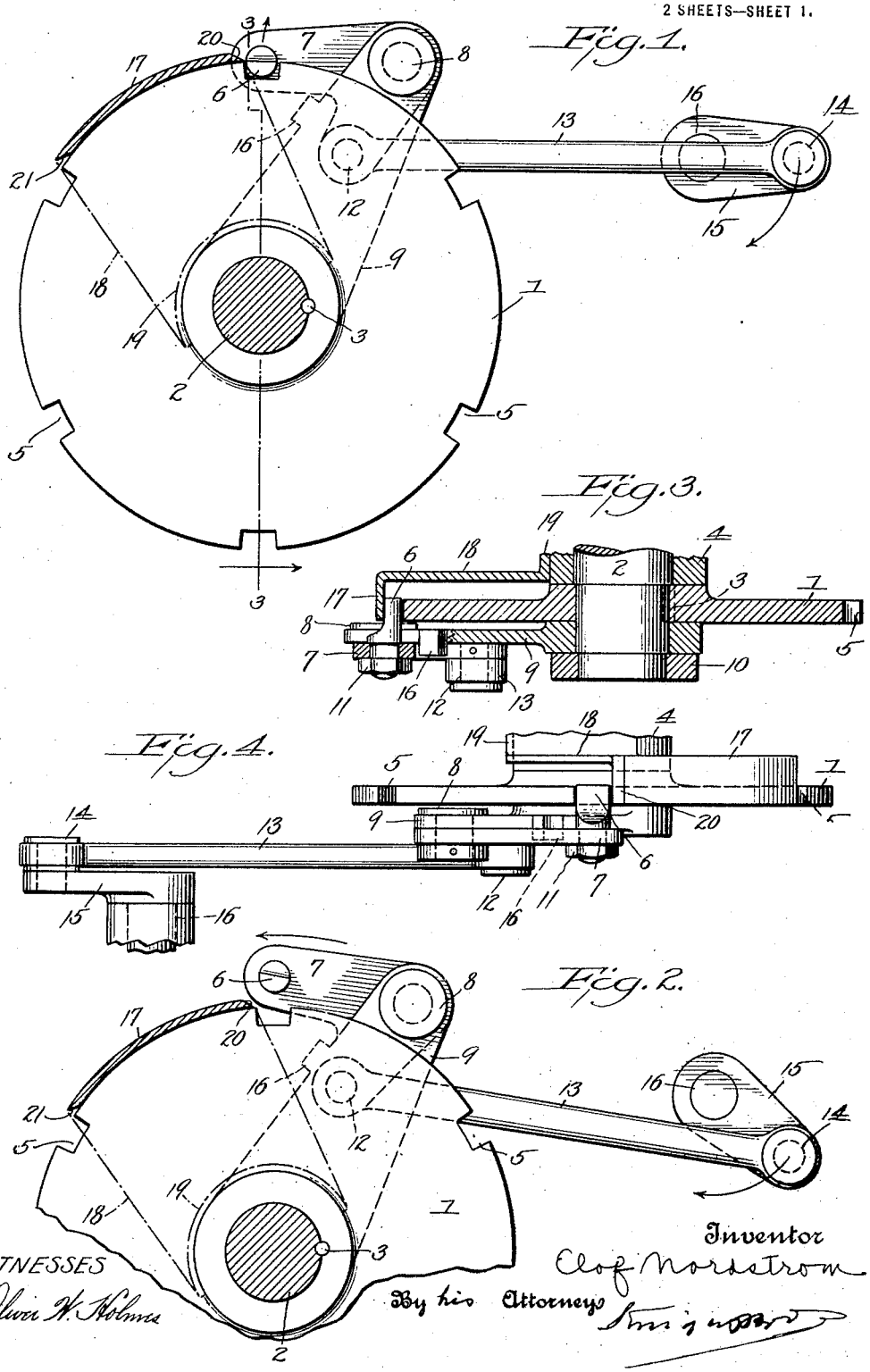

UNITED STATES PATENT OFFICE.

ELOF NORDSTROM, OF NEWARK, NEW JERSEY, ASSIGNOR, BY MESNE ASSIGNMENTS, TO AMERICAN DAN BOTTLE SEAL CORPORATION, A CORPORATION OF DELAWARE.

INDEX MECHANISM.

1,383,331.   Specification of Letters Patent.   Patented July 5, 1921.

Application filed March 24, 1919. Serial No. 284,649.

*To all whom it may concern:*

Be it known that I, ELOF NORDSTROM, a citizen of the United States, residing at Newark, county of Essex, and State of New Jersey, have invented certain new and useful Improvements in Index Mechanism, of which the following is a specification.

This invention relates more especially to that class of index mechanisms in which a step by step movement is imparted to a rotary table by means of a continuously oscillatable driving arm which is preferably connected to a continuously rotating drive shaft. The primary object of my invention is to provide improved indexing means which will render the step by step movement positive, uniform in extent and exactly located with respect to the extreme positions of the oscillatory arm. One of the objects of the present invention is to provide improved oscillatable table feeding means which will bring the rotary table to a standstill before releasing said table and which will move into positive engagement with said table before beginning to impart a new movement thereto. Other and more specific objects of invention will appear in the specification and be pointed out in the appended claim, reference being had to the accompanying drawings which represent a preferred embodiment of my invention.

Figure 1 is a top plan view of the preferred embodiment of my invention, parts being shown in section.

Fig. 2 is a similar view with the parts shown in different positions, parts being broken away and parts shown in section.

Fig. 3 is a section on the line 3, 3 Fig. 1, parts being shown in elevation.

Fig. 4 is a side elevation of the parts shown in Fig. 1 as they would appear viewing Fig. 1 from top to bottom.

Fig. 5 is a view similar to Figs. 1 and 2 showing the parts during the idle stroke of the index driving mechanism.

Fig. 6 is a similar view showing the parts during the stepped movement imparted by such mechanism.

Fig. 7 is a side elevation taken from the top of Fig. 5.

In the embodiment of my invention shown on the drawings, the rotary plate or table 1 is made rigid with a vertical shaft 2 by means of a key 3, said shaft being journaled in a bearing 4. Around its periphery said plate or table 1 is provided with notches or sockets 5 which successively receive the reduced outer end of a pin 6. Said pin 6 passes through one arm 7 of a bell crank lever which is journaled on a bolt or stud 8 which is carried on the outer end of an oscillatory arm 9 which is slidably supported by collar 10 to swing about the axis of the shaft 2. The pin 6 is secured in the arm 7 of said bell crank lever by means of a nut 11. The other arm of the said bell crank lever carries a stud 12 to which is pivotally connected one end of a connecting rod 13, the other end of said connecting rod being pivotally connected to a stud 14 which is carried by the outer end of a crank arm 15 keyed to a power driven shaft 16. On one edge of the arm 9 is a stop or shoulder 16 by means of which the annular movement of the bell crank lever on its stud 8 is limited with respect to the oscillatory arm 19. The driving shaft 16 revolves the crank 15 in the direction of the arrows shown in Figs. 1, 2, 5 and 6. In order to provide suitable and efficient means for preventing the index driving mechanism from engaging the plate or table during its movement from one extreme to the other of its idle movement and to hold said means in positive engagement with the plate or table throughout its driving stroke, rail or guard 17 is arranged adjacent the periphery of the plate or table 1 and preferably concentric therewith. Said rail or guard 17 is supported from a top plate 18 which projects laterally from a cylindrical wall 19 mounted on bearing 4. The pin or stud 6 has its outer end reduced to an approximate semicircular cross section to adapt it to slide along the inner wall of the rail or guard 17 while socketed in any one of the notches 5 in the periphery of said plate or table 1. Said rail or guard 17 is provided with an outwardly presented beveled edge 20 at one end, and an inwardly presented beveled edge 21 at the other end to adapt it to coöperate with the curved wall of the pin 6 in guiding said pin outwardly during the idle movement of said index driving mechanism. The inwardly presented beveled surface 21 on the other end is adapted to guide the pin 6 inwardly to a position in which its further movement during the driving stroke is confined in the socket by the inner wall of the rail or guard 17. The operation of my invention will now be readily understood and briefly described is as follows:

Considering the parts to be in the positions shown in Fig. 1, the crank arm 15 is about to begin its return movement for imparting the idle stroke to the pin 6. As the crank pin 14 swings in the arc indicated by the arrow in Fig. 1, the bell crank 11 is swung about pin 8 until one arm thereof is brought into engagement with the stop 16 on the oscillatory arm 9. This movement throws the pin 6 out of the socket 5 before said arm 9 begins the idle stroke. This position of the parts is shown in Fig. 2. As the crank arm 15 continues its movement, the pin 6 progresses along the outer wall of the rail or guard 17 until said crank arm reaches its inner dead point which brings the pin 6 in register with the next notch 5 in the plate or table 1. The crank arm 15 now begins its outward stroke and since the pin 6 is no longer held in its outer course by plate 17, it is drawn into the notch 5 before the oscillatory arm 9 begins its power stroke. As shown in Fig. 6, the pin 6 is then drawn along the inner wall of the guard or rail 17, being retained in the notch 5 by means of said rail or guard and thus insuring a positive driving engagement throughout the power stroke of the index driving mechanism.

I claim:

The combination with a rotary table provided with peripheral notches, of an arm oscillatable about the axis of said rotary table, a bell crank lever pivoted on the outer end of said oscillatable arm, a pin carried by one arm of said bell crank lever and adapted to fit said notches, a plate arranged adjacent the periphery of said table, said plate having a length substantially equal to the distance between two adjacent notches, said pin being confined between said plate and one of said notches during each movement of the table and means connected to the other arm of said bell crank lever for imparting movements to said bell crank lever to move said pin into and out of engagement with a notch and through said bell crank imparting the oscillatory movements to said arm.

ELOF NORDSTROM.